(12) United States Patent
Mutschler et al.

(10) Patent No.: US 9,537,937 B2
(45) Date of Patent: Jan. 3, 2017

(54) APPARATUS, METHOD AND COMPUTER PROGRAM FOR MIGRATING AN EVENT DETECTOR PROCESS

(75) Inventors: Christopher Mutschler, Erlangen (DE); Michael Philippsen, Heroldsberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 254 days.

(21) Appl. No.: 14/354,976

(22) PCT Filed: Mar. 14, 2012

(86) PCT No.: PCT/EP2012/054475
§ 371 (c)(1),
(2), (4) Date: Apr. 29, 2014

(87) PCT Pub. No.: WO2013/064273
PCT Pub. Date: May 10, 2013

(65) Prior Publication Data
US 2014/0297800 A1    Oct. 2, 2014

(30) Foreign Application Priority Data
Oct. 31, 2011    (WO) ................. PCT/EP2011/069159

(51) Int. Cl.
*H04L 29/08*    (2006.01)
*G06F 9/50*    (2006.01)
(Continued)

(52) U.S. Cl.
CPC ............. *H04L 67/10* (2013.01); *G06F 9/4856* (2013.01); *G06F 9/542* (2013.01); *G06F 9/5088* (2013.01)

(58) Field of Classification Search
CPC ........ H04L 67/10; G06F 9/4856; G06F 9/542; G06F 9/5088
See application file for complete search history.

(56) References Cited

U.S. PATENT DOCUMENTS

| | | | |
|---|---|---|---|
| 8,478,743 B2 * | 7/2013 | Chandramouli | .. G06F 17/30463 707/718 |
| 8,479,216 B2 * | 7/2013 | Lakshmanan | ......... G06F 9/5088 709/201 |
| 8,521,974 B2 | 8/2013 | Musolff | |

FOREIGN PATENT DOCUMENTS

| | | |
|---|---|---|
| CN | 1698388 A | 11/2005 |
| CN | 101013387 A | 8/2007 |

(Continued)

OTHER PUBLICATIONS

Endler, et al., "General Approaches for Implementing Seamless Handover," POMC '02, Proceedings of the 2nd ACM International Workshop on Principles of Mobile Computing, pp. 17-24, Toulouse, France, Oct. 30, 2002.

(Continued)

*Primary Examiner* — Patrice Winder
(74) *Attorney, Agent, or Firm* — Murphy, Bilak & Homiller, PLLC (57) ABSTRACT

Embodiments relate to a concept for migrating an event detector of a first node ($N_1$) of a distributed computing system (200) to a second node ($N_2$) of the distributed computing system, wherein the event detector processes a plurality of input events (e; A, B, C) to generate at least one output event (D) based on the input events, wherein each of the input events has associated therewith an individual event delay corresponding to a propagation time of the input event to the first node ($N_1$). It comprises transferring (112; 312), from the first node ($N_1$) to the second node ($N_2$), information on event delays corresponding to the plurality of input (Continued)

events (e; A, B, C) at the first node ($N_1$); transferring (114; 314) a content of the event detector from the first node ($N_1$) to the second node ($N_2$) to obtain a migrated event detector at the second node; forwarding (116; 316) the plurality of input events (e; A, B, C) from the first node ($N_1$) to the second node ($N_2$); receiving (122), at the second node ($N_2$), the plurality of input events (e; A, B, C) forwarded from the first node ($N_1$) and, in parallel, from originating event detectors associated to the plurality of input events; and processing (124; 320), at the second node ($N_2$), the plurality of received input events (e; A, B, C) based on the transferred information on the event delays and based on event delays of the plurality of input events (e; A, B, C) received from the associated originating event detectors.

14 Claims, 5 Drawing Sheets

(51) Int. Cl.
  *G06F 9/54* (2006.01)
  *G06F 9/48* (2006.01)

(56) References Cited

FOREIGN PATENT DOCUMENTS

| JP | 08137691 A | 5/1996 |
|---|---|---|
| JP | 09244984 A | 9/1997 |
| JP | 2011128738 A | 6/2011 |
| WO | 9917478 | 4/1999 |
| WO | 2004064292 A2 | 7/2004 |
| WO | 2011057874 A2 | 5/2011 |
| WO | 2011127059 A1 | 10/2011 |

OTHER PUBLICATIONS

Banavar et al, "An Efficient Multicast Protocol for Content-Based Publish-Subscribe Systems," IBM T.J. Watson Research Center, Hawthorne, NY, pp. 1-9.

Defago et al, "Total Order Broadcast and Multicast Algorithms: Taxonomy and Survey," ACM Computing Surveys, vol. 36, No. 4, Dec. 2004, pp. 372-421.

Floyd et al, "A Reliable Multicast Framework for Light-weight Sessions and Application Level Framing," IEEE/ACM Transactions on Networking, Dec. 1997, pp. 1-19.

Garcia-Molina, "Ordered and Reliable Multicast Communication," ACM Transactions on Computer Systems, vol. 9, No. 3, Aug. 1991, pp. 242-271.

Mutschler et al, "Distributed Event Processing for High Data Rate Sensor Streams," Erlangen, Germany, pp. 1-2.

Opyrchal et al, "Exploiting IP Multicast in Content-Based Publish-Subscribe Systems," J. Sventek and G. Coulson (Eds): Middleware 2000, Springer-Verlag Berlin Heidelberg 2000, pp. 185-207.

\* cited by examiner

| Algorithm 3: Delay Adaption, Echo Cancellation |
|---|
| Data: $ED_{new}$, $d_f$, $ExpectedDelayList\ delays$ |

```
      begin
502 →     EventList echo;
          for delay d : delays do
504 →       ⌊ d ← d + d_f;
506 →     ED_new.K ← K ← max(delays);        // set K
          Event e;
508 →     while e.receive() do
              if e.id ∉ ED_new.GetSubscriptions() then
510 →           ⌊ continue;
512 →         if e.isDirect() then
514 →           ⌊ delays.at(e.id) ← clk-e.ts;
516 →           K_n ← max(delays);
                if K_n ≠ K then
518 →             ⌊ ED_new.K ← K ← K_n;     // retrofit K
                    NotifyDelayChange();
520 →           ⌊ StopForward(e.id);
              if echo.contains(e) then
522 →           ⌊ echo.erase(e);             // duplicate.
              else
524 →           ⌊ echo.add(e);
                    ED_new.pushToOrderingUnit(e);
```

Fig. 5

APPARATUS, METHOD AND COMPUTER PROGRAM FOR MIGRATING AN EVENT DETECTOR PROCESS

Embodiments of the present invention generally relate to data networks and, in particular, to apparatuses and methods for transferring or migrating event detectors between different nodes of a distributed computing system.

BACKGROUND

Sensor networks, such as, for example, wireless sensor networks, have a wide range of applications. For example, wireless sensor networks of various technologies may be used for locating purposes, such as locating humans and/or other objects. Here, "locating" means the detection or determination of a geographical location or position. Some specialized locating or position tracking systems may be used for locating players and other objects (e.g. a ball) in sport events, such as, for example, soccer, American football, rug-by, tennis, etc.

With using gathered geographic location or positioning data of players and/or a ball it is possible to derive statistical information related to the whole sports event, for example a soccer match, or related to individual teams or players. Such derived statistical information may be interesting for various reasons. On the one hand, there are various commercial interests as certain statistics and their analysis may be of particular relevance for spectators in a stadium and/or in front of a television set at home. Hence, providing certain statistics may raise more interest in sport events. On the other hand, statistical data derived from the raw positioning data may as well be used for training purposes. Here, an opponent and/or the behavior of the own team may be analyzed as well as the performance and/or health condition of individual players.

The aforementioned locating or position tracking systems may be based on various technologies. For example, location information may be determined based on the evaluation of wireless radio signals and/or magnetic fields. For this purpose transmitters and/or receivers, generally also denoted as sensors, may be placed at the individual objects (e.g. players, ball, etc.) to be located by the system. Corresponding reception and/or transmission devices may also be mounted to predetermined locations around a geographical area of interest, as e.g. a soccer field. An evaluation of signal strengths, signal propagation times, and/or signal phases, just to name a few possible technical alternatives, may then lead to sensor data streams indicative of the geographic position of individual players or objects at different time instants. Typically, a geographic location data sample is associated with a timestamp indicating at which time an object was located at which geographic position. With this combined information kinematic data, like velocity (speed), acceleration, etc. may as well be provided in addition to the location data comprising, for example, x-, y-, and z-coordinates. In the sequel of this specification the location and kinematic data delivered by the localization sensor system will also be referred to as (raw) sensor data.

In a particular example of a wireless tracking system people or objects may be equipped with tiny transmitters, which may be embedded in footwear, uniforms and balls and whose signals are picked up by a number of antennas placed around the area under observation. Receiver units process the collected signals and determine their Time of Arrival (ToA) values. Based on a calculation of the differences in propagation delay, each transmitter's position is then continuously determined. In addition, a computer network integrated with the wireless tracking system may analyze the position or sensor data so as to detect specific events. Operating in the 2.4 or 5 GHz band, the tracking system is globally license-free.

Based on the raw sensor data streams outputted from the locating or position tracking system so-called "events" may be detected. Thereby an event or event type may be defined to be an instantaneous occurrence of interest at a point of time and may be defined by a unique event ID. In general, an event is associated with a change in the distribution of a related quantity that can be sensed. An event instance is an instantaneous occurrence of an event type at a distinct point in time. An event may be a primitive event, which is directly based on sensor data (kinematic data) of the tracking system, or a composite event, which is based on previously detected other events instead. That is to say, a composite event is not directly depending on raw sensor data but on other events. In ball game applications, an event may, for example, be "player X hits ball" or "player X is in possession of ball". More complicated events may, for example, be "offside" or "foul". Each event instance may have three timestamps: an occurrence, a detection, and an arrival timestamp. All timestamps are in the same discrete time domain. The occurrence timestamp is is the time when the event has actually happened, the detection timestamp dts is the time when the event has been detected by an event detector, and the arrival timestamp ats is the time when the event was received by a particular Event Processing System (EPS) node. The occurrence and the detection timestamp are fixed for an event instance at any receiving node whereas the arrival timestamp may vary at different nodes in the network.

The detection of events (Complex Event Processing, CEP) based on underlying sensor data streams has raised increased interest in the database and distributed systems communities in the past few years. A wide range and ever growing numbers of applications nowadays, including applications as network monitoring, e-business, health-care, financial analysis, and security or the aforementioned sport-event supervision, rely on the ability to process queries over data streams that ideally take the form of time ordered series of events. Event detection denotes the fully automated processing of raw sensor data and/or events without the need of human intervention, as in many applications the vast quantity of supplied sensor data and/or events cannot be captured or processed by a human person anymore. For example, if high speed variations of players or a sports object, e.g. a ball, are to be expected, the raw sensor (locating or position tracking) data has to be determined at a sufficiently high data rate by the underlying (wireless) sensor network. Additionally, if there is a high number of players and/or objects (e.g. in soccer there are 22 players and a ball) to be tracked the amount of overall geographic location and kinematic data samples per second can become prohibitively high, in particular with respect to real-time event processing requirements.

Hence, even if raw sensor and/or event data streams are analyzed and signaled fully automated, there may still be by far too many information, which is possibly not even of any interest in its entirety. In the future this problem will even get worse as more and more devices will be equipped with sensors and the possibility to provide their determined sensor data to public networks such as the Internet for (e.g., weather or temperature data determined by wireless devices like smart phones). For this reason the amount of sensor data to be processed further into certain events of interest will rapidly grow. Automated event detection may provide remedy for this by trying to aggregate the raw sensor data piece by piece and to determine more abstract and inter-dependent events, which may transfer by far more information than the raw sensor data itself. For example, beside the aforementioned soccer-related examples, such determined events could include "car X is located at crossing Y" or "traffic jam on route X".

The problem that arises in automated event detection is the required computing power for performing event detection on possibly massively parallel sensor and/or event data streams—and all this under at least near real-time processing requirements. This problem may be solved by parallelization of event detectors, which may, for example, run on different (i.e. distributed) network nodes of a computer network, which may, for example, communicate via Ethernet. Thereby an event detector automatically extracts a certain event of interest from an event or sensor data stream according to a user's event specifications. Individual event detectors may be distributed over different network nodes of a data network, wherein the different event detectors communicate using events and/or sensor data travelling through the network using different network routes and branches. Thereby, raw sensor data and/or event may be transported in data packets according to some transport protocol, like, e.g., UDP (User Datagram Protocol), TCP (Transmission Control Protocol)/IP (Internet Protocol), etc. This concept, however, causes new problems with respect to possibly unbalanced computational load among different network nodes and with respect to the synchronization of event data streams within the network. Without suitable countermeasures the computational loads among different network nodes are unbalanced and individual sensor and/or event data streams in the network are not time-synchronized to each other, which means that individual events may reach an event detector out of their original temporal order and thereby lead to false detected results.

Let us look at an exemplary soccer-scenario, wherein a plurality of parallel automatically operating event detectors is supposed to detect a pass from player A to player B. In order to detect the "pass"-event, the following preceding event sequence is required:
1. "player A is in possession of ball",
2. "player A kicks ball",
3. "ball leaves player A",
4. "ball comes near player B",
5. "player B hits ball"

The event detection for event "player X kicks ball" may be based on the event sequence "player X near ball" and a detected acceleration peak of the ball. There are the following alternatives for setting up an automated event detector for said event "player X kicks ball":

We may wait for individual required events—one after the other. If we have seen all the required events in the correct (temporal) order (here, any abortion criterions are disregarded for the sake of simplicity) we can say that we have seen or experienced a pass. However, for complex applications the detection of all the required events does not necessarily take place on a single network node or a CPU (Central Processing Unit) due to the parallelization of event detectors. For this reason it is not necessarily guaranteed that individual required events reach the event detector in the correct required order. This may, for example, be due to network jitter, varying and/or unbalanced CPU-load or increased network load. For example, consider an event stream consisting of event instances $e_1, e_2, \ldots, e_n$, with $e_k.ats < e_{k+1}.ats$, $(1 \leq k < n)$, i.e., the events in the event stream are sorted by their arrival time in ascending order. If any event $e_i$ and $e_j$ with $1 \leq i < j \leq n$ exists, such that $e_i.ts > e_j.ts$, then event $e_j$ is denoted as an out-of-order event.

Hence, we could try to buffer events and then search the buffer for the correct event pattern. But which buffer size should be used? If we say a pass has to happen within maximum 5 seconds we would have to consider events within a time period of maximum 5 seconds after the first relevant event until we have either detected the pass or until we abort. However, it is also possible that the last relevant event is computationally quite complex, what requires a small additional buffer. But what is the size of this additional buffer? And what is the buffer-size related to composite event detectors that require the "pass"-event as an input event?

The K-slack algorithm of S. Babu, U. Srivastava, and J. Widom, "Exploiting k-constraints to reduce memory overhead in continuous queries over data streams," ACM Trans. Database Systems, vol. 29, pp. 545-580, 2004, is a well-known solution to deal with out-of-order events in event detection. K-slack uses a buffer of length K to make sure that an event $e_i$ can be delayed for at most K time units (K has to be known a-priori). However, in a distributed system the event signaling delays are dependent on an entire system/network configuration, i.e., the distribution of the event detectors, as well as the network- and CPU-load. Neither the final system configuration nor the load scenario may be foreseen at the time of compilation.

An approach by M. Li, M. Liu, L. Ding, E. A. Rundensteiner, and M. Mani, "Event stream processing with out-of-order data arrival," in Proc. 27th Intl. Conf. Distributed Computing Systems Workshops, (Washington, D.C.), pp. 67-74, 2007, buffers an event $e_i$ at least as long as $e_i.ts + K \leq clk$. As there is no global clock in a distributed system, each node synchronizes its local clock by setting it to the largest occurrence timestamp seen so far.

An ordering unit that implements the K-slack approach applies a sliding window with a given K to the input stream, delays the events according to their timestamps, and produces an ordered output stream of events. However, a single fixed a-priori K does not work for distributed, hierarchical event detectors. As K-slack takes K time units to generate a composite event, an event detector on a higher layer that also buffers for K units and waits for the composite event, misses said event. Waiting times add up along the event detector hierarchy.

M. Liu, M. Li, D. Golovnya, E. Rundensteiner, and K. Claypool, "Sequence pattern query processing over out-of-order event streams," in Proc. 25th Intl. Conf. Data Engineering, (Shanghai, China), pp. 784-795, 2009, avoid such problems by specifying an individual K for each event detector. Each $K_n$ (n denoting the hierarchy level) must be set to a value larger than $\max(K_{n-1})$, i.e., larger than the maximum delay of all subscribed events. Thereby a subscribed event is an event of interest for the respective event detector. The event detector of hierarchy level n subscribes to an event of a lower hierarchy level in order to use it as an input to detect a higher hierarchy event. Although this sounds good at first glance, choosing proper values for all $K_j$ is difficult, application- and topologyspecific, and can only be done after careful measurements. Conservative and overly large $K_i$ result in large buffers with high memory demands and in long delays for hierarchical CEP (as delays add up). Too large $K_j$ must be avoided. In theory, for a general purpose system the smallest/best $K_j$ can only be found by means of runtime measurements as the latencies depend on the distribution of event detectors and on the concrete underlying network topology. Moreover, best $K_j$-values change at runtime when detectors migrate.

With a given stream of incoming events $e_i$, a key idea for overcoming aforementioned problems is to perform these runtime measurements by comparing an event's occurrence timestamp is with its arrival timestamp ats. That is to say, embodiments of the present invention are based on the assumption that a recovery of an original temporal order of events reaching an event detector via different network paths and, hence, experiencing different processing and/or propagation delays $\delta(.)$, may be achieved by delaying the events appropriately before forwarding or relaying them to a subsequent event detector. The time at which an event is relayed to the subsequent (downstream) event detector may be based on the original timestamp of the respective event and the processing and/or propagation delays of all input events required by the subsequent event detector in order to determine its output event.

In order to guarantee for a minimum required common delay value, i.e. to enable a possibly fast relaying of the (at least) two events, an output time for relaying a first and a second input event to their associated downstream event detector may be determined based on the first and the second event timing value (of the respective event) and based on a maximum delay of the first and the second event. Thereby a delay $\delta(.)$ of an event may be due to several reasons. For example, an event's delay within the distributed computing system may be due to different jitter conditions on different network paths, or due to different processing durations and/or different network latencies. In other words, a reception order of the first and the second event at the input of the delay compensator may be different from an original occurrence order of the first and the second event due to different jitter conditions, different processing durations and/or different network latencies.

The event delays of the first and the second event, respectively, may be measured or determined based on a reception/arrival time of the first and the second event at an ordering unit and based on their respective associated event timing values reflecting the event occurrences. When denoting a propagation or signaling delay of an event $e_i$ (i=1, 2, . . . ) from its occurrence or detection time $t_{event,ei}$ (i=1, 2, . . . ) to the input of the delay compensator by $\delta(.)$, the ordering unit may be operable to determine output time instances $t_{out,ei}$ (i=1, 2, . . . ) for relaying the first and the second event to the subsequent event detector based on $$t_{out,e1,e2} = t_{event,e1,e2} + \max(\delta(e_1), \delta(e_2)).$$

wherein max(.) denotes the maximum operator. That is to say, the ordering unit may be operable to determine a maximum delay value taken from the set of event delays associated to the first and the second event. In case there are more than two events to be relayed by the ordering unit, then, of course, the ordering unit may determine the common delay value by taking the maximum delay value from the set of event delays associated to the more than two events.

Due to various effects within the distributed system the value for $K=\max\delta(e_1), \delta(e_2))$ may change. Also, when clk changes unexpectedly at an event detector, this may lead to wrong guesses for K and, hence, to wrong detector outputs.

The first aforementioned problem, i.e., a sudden increase of $K_j$, is rare as often event delays remain stable. If it occurs we cannot guarantee correct ordering in general. But a probabilistic safety margin for delays may be provided to alleviate this problem. In contrast, we can always avoid the second problem, i.e., unexpected changes of clk. An idea embodiments of the present invention may rely on is to no longer set the clock to the largest timestamp seen so far on any incoming events, but to only use a designated type of event for setting clk.

An unexpected change of clk can be avoided if we set a network node's clock only on certain types of incoming events. While the above definition of out-of-order events has identified events that are late, we now use the clk-values to postpone events that arrive too early. Between any two updates of clk, un-postponed events are ordered according to their timestamps. More formally, consider an event stream $e_1, e_2, \ldots, e_n$ as before. Assume that clk is only set by events of type ID. An event $e_j$ is an out-of-order event, if there exists no $e_i$, $e_k$, with $e_{i.id}=e_{k.id}=$ID so that $e_i.ts \le e_j.ts \le e_k.ts$. The event delay of $e_i$ can be given by $\delta(e_j)=e_k.ts-e_j.ts$.

The remaining question is which event type to pick for setting clk. The higher the occurrence frequency of the picked event type is, the fewer events need to be postponed, the smaller are the resulting K-values, and the better are the measured delays. If there is a choice of event types, the one with the more stable and fixed delay is preferable, because it better reflects the real time. If otherwise the events of a certain type vary in their arrival times, clk does not behave smoothly. To increase the clock update frequency, instead of using just one event type, it is possible to use a set of event types to set the clock, provided those event types have the same absolute delays, for example if they are sensor events from the same source. High data rate sensor events with precise timestamps are excellent candidates.

Taking sensor events, i.e. raw sensor data, as stable clock update events let us determine a proper value for K. But the first problem of sudden increases of K is still open. If K is too small, we miss events or process them out-of-order, and then increase K to fit for future event delays. With an added safety margin, i.e., a slightly larger K, such detection errors can be avoided. Instead of fixing K after an error has occurred, it is possible to overfit K with the expected variation of the delays. Remember that K is defined as the maximal delay of all subscribed events of an event detector. Estimating the delays of the particular events more exactly results in a safer K-value. To make a better guess for the delay that we expect for an event $e_i$, it is possible to use all recent delay measurements of $e_i$ and determine their standard deviation. The guessed delay is then the maximal delay of $e_i$ plus the product of the standard deviation and a scaling factor $\lambda$. $\lambda$ may be defined by the system architect and has influence on the probability that K will be large enough. With such K-values we can order input event streams even with unstable event delays.

However, if a K-value grows for a certain event detector, this fact remains unknown to a subscribing event detector further up the detector hierarchy. The upper level detector will only notice a changed and potentially too large delay when the subscribed event is actually generated. Then the upper level K may be too small to avoid misdetection and retrofitting of K. But the upper level detector could have modified its K early enough if it only had been informed earlier. Hence, whenever K changes it is possible to notify subscribers so that they can modify their K-values if necessary. For that, it is possible to immediately send a pseudo-event with a suitable timestamp. The recipient may only use such a pseudo-event for configuration purposes.

Now, we have both a sufficiently good K and a stable clock clk. However, this does not yet produce a sorted or ordered event stream. We need an event ordering unit that works on an out-of-order stream to provide a sorted input to the subsequent detector. Such an ordering unit may be implemented as a black box and may just be mounted between the original event stream and the input of the event detector so that there is no need to modify the event detector itself. The output stream of the ordering unit is a sorted sequence of events with a minimal delay. Whenever an input event is received (pseudo-events are ignored), it is sorted into a buffer of the ordering unit according to its occurrence timestamp. If out-of-order events are rare, insertion sort of new events usually is just a simple and fast push to the head of the buffer. Whenever clk is updated and $e_i.ts+K \leq clk$ holds for some tail events $e_i$ in the buffer, those $e_i$ may be emitted to the output stream of the ordering unit and the next input event may be processed.

Note that there is usually more than one event detector per machine or network node, each of which may have a dedicated ordering unit with a suitable and detector-specific K that only picks its subscribed events from the main event stream.

In distributed event processing it may be necessary to move an event detector from one machine to another at runtime. This may be caused by many reasons, e.g., machines may need to be shut down for maintenance or due to system failures, or machines may get overloaded or even exhausted and cannot perform their event processing jobs fast enough. Those changes may be a result of the dynamics in the analyzed environment, for instance sudden stock trades.

Related work on runtime migration of processes or objects is mainly done in the area of virtual machines (VMs). For example, R. Bradford, E. Kotsovinos, A. Feldmann, and H. Schioberg, "Live wide-area migration of virtual machines including local persistent state," in Proc. $3^{rd}$ Intl. Conf. Virtual Execution Environments, (San Diego, Calif.), pp. 169-179, 2007, deal with the transfer of local persistent VM state. After migration, network connections are being redirected to the new host and commands from old connections are forwarded. The old VM is closed as soon as all the old connections are gone. However, both machines not only have to run in parallel while commands are being forwarded, but the order in that commands are received over the network is ignored.

CR/TR-Motion of H. Liu, H. Jin, X. Liao, L. Hu, and C. Yu, "Live migration of virtual machine based on full system trace and replay," in Proc. 18th ACM Intl. Symp. High Performance Distributed Computing, (Garching, Germany), pp. 101-110, 2009, uses checkpoint/recovery and trace/replay technology to achieve a fast migration of VMs. Checkpoints from the source VM are recovered at the destination, and call traces from the source are replayed so that both machines are consistent. The down time is significantly lower than in previous approaches. However, the authors do not consider that the order of incoming commands may be different at the new host.

The approach of V. Medina and J. M. Garcia, "Live replication of virtual machines," in Proc. 10th WSEAS Intl. Conf. Software Engineering, Parallel and Distributed Systems, (Stevens Point, Wis.), pp. 15-23, 2011, is similar to CR/TR-Motion but assumes replicas right from the beginning. The user interacts with one VM, but commands are also sent to a replica so that both VMs are always synchronized. When the old machine stops working, the client-side protocol sends the commands to the replicated VM and presents the response of the replica. However, the commands are redirected from the clients' side, which means that ordering may be different after switching to the replica.

None of the approaches consider the order of incoming commands and/or data explicitly. That is because usually the source of the commands, i.e., the user's workstation, is static and commands are still received in correct order. However, if we deal with multi-user VMs, problems may occur if two users try to modify the same file. At the original VM, user A's command may be received first, whereas at the migrated VM, user B's command will be first. The VMs are then out-of-sync. Approaches like CR/TR-Motion would repeat the recovery and replay process in such unlikely situations. However, for event detection such situations are very likely, and migration would never finish.

Hence, it is desirable to improve the state-of-the-art for efficiently and safely migrating event detectors operating on incoming out-of-order events from one network node to another.

SUMMARY

For detecting events, such as primitive and/or composite events, various event detectors may be running on different nodes of a distributed computing system. Such event detectors may cause different loads on their respective associated nodes and/or the whole distributed computing system, depending on the condition of the system and/or depending on the computational complexity of the event detector's underlying algorithm and/or the sensor data to be analyzed. Hence, in a scenario of changing premises or conditions of an original system configuration, an original distribution of the event detectors onto the various network nodes could turn out to be suboptimal with respect to computational load balance or could even lead to a crash of the distributed computing system.

Such undesirable load unbalances may be counteracted by embodiments of the present invention. If, for example, at least one event delay reaches a prohibitively high value, this may be an indicator for that fact a source event detector, from which the corresponding event reaches a destination event detector, is overloaded or experiences some other problems. In such a scenario it may be desirable to transfer or relocate the malicious source event detector process or object to some other hardware resource of the distributed computing system. For example, the malicious source event detector process or object may be transferred or migrated from its current node to another, physically separate and different node of the distributed computing system, which has more hardware resources available.

It is one finding of the present invention that the migration of an event detector from one machine to another machine leads to different event delays of the events handled by the affected event detector. When an event detector is migrated from a first network node to a second network node, source nodes of the subscribed events remain the same, but the related event delays will most definitely change. Unless delays shrink for all involved events, a naive event detector migration is likely to fail because the migrated event detector (or any event detectors on a higher layer) no longer sees the subscribed events in a correct order because the K-value that worked well on the first (old) node is too small for the second (new) node and the new resulting event delays.

Hence, it is one objective of the present invention to guarantee ordered input events for the migrated event detector.

It is one finding of the present invention that for a cooperative event detector handover the new node of a distributed computing system not only subscribes necessary input events from their originating or source nodes, but the old node also forwards those events to the new node as well. The new node may derive the correct event order by combining delay information from events that arrive at the new node along two paths, i.e. the forwarded path (from the source nodes via the old node) and the direct path (from the source nodes directly).

According to a first aspect it is provided a method for migrating an event detector (process or object) from a first node (i.e. old node) of a distributed computing system to a second node (i.e. new node) of the distributed computing system. The event detector processes a plurality of input events to generate at least one output event based on the input events. Each of the input events has associated therewith an event delay corresponding to a propagation time or delay of the respective input event to the first node, wherein the propagation time may be regarded as a difference between an event occurrence time and a subsequent event reception or arrival time of the respective event at the first node. The method comprises a step of transferring, from the first node to the second node, information on the event delays corresponding to the plurality of input events at the first node, a step of transferring a (process or object) content of the event detector from the first node to the second node to obtain a migrated event detector at the second node, a step of forwarding the plurality of input events from the first node to the second node, a step of receiving, at the second node, the plurality of input events forwarded from the first node and, in parallel, from originating event detectors associated to the plurality of input events, a step of (ordered) processing, at the second node, the plurality of received input events based on the transferred information on the event delays and based on event delays of the plurality of input events received from the associated event detectors.

According to a further aspect it is also provided a distributed computing system for migrating an event detector from a first node of the distributed computing system to a second node of the distributed computing system. The distributed computing system comprises the first node having means for transferring, from the first node to the second node, information on the event delays corresponding to the plurality of input events at the first node, means for transferring a content of the event detector from the first node to the second node to obtain a migrated event detector at the second node, and means for forwarding the plurality of input events from the first node to the second node. The distributed computing system further comprises the second node having means for receiving, at the second node, the plurality of input events forwarded from the first node and, in parallel, from originating event detectors associated to the plurality of input events, means for processing, at the second node, the plurality of received input events based on the transferred information on the event delays and based on event delays of the plurality of input events received from the associated event detectors.

Hence, embodiments also provide the first and/or the second node of the distributed computing system.

Accordingly, it is also provided a first method (for the first node) for migrating an event detector from the first node to the second node of the distributed computing system. The method comprises a step of transferring, from the first node to the second node, information on the event delays corresponding to the plurality of input events at the first node, a step of transferring a content or state of the event detector from the first node to the second node to obtain a migrated event detector at the second node, and a step of forwarding the plurality of input events from the first node to the second node.

It is also provided a second method (of the second node) for migrating an event detector from the first node to the second node of the distributed computing system comprises a step of receiving, at the second node, the plurality of input events forwarded from the first node and, in parallel, from originating event detectors associated to the plurality of input events, and a step of processing, at the second node, the plurality of received input events based on the transferred information on the event delays and based on event delays of the plurality of input events received from the associated event detectors.

Some embodiments comprise digital control circuits installed within the nodes or apparatuses. Such a digital control circuitry, e.g. a digital signal processor (DSP) or an Application-Secific Integrated Circuit (ASIC), needs to be programmed accordingly. Hence, yet further embodiments also provide a computer program having a program code for performing embodiments of the method, when the computer program is executed on a computer or a digital processor.

According to embodiments, an event detector is to be understood as an instance of a computer program that is being executed on a node of the distributed system. An event detector comprises the computer program's program code and its current activity. The distributed system may be a distributed computer network or a multi-core processor, for example. In case of a computer network, a node, i.e. network node, may comprise computer device or a processing unit (e.g. CPU) thereof communicating with other network nodes via Ethernet, for example, or some other form of networking technology. That is to say, according to a further aspect of the present invention it is also provided a distributed computing system for determining events based on at least one (raw) sensor data stream. The provided distributed computing system, which may be a computer network, comprises a plurality of distributed nodes, each having an event detector associated therewith, and at least one embodiment of an apparatus for migrating event detectors between the distributed nodes of the distributed computing system.

The event detector process transfer or migration procedure may, for example, be performed with the aid of an Operating System (OS) controlling the distributed computing system. An OS thereby is to be understood as a set of programs that manages computer hardware resources of the distributed system, and provides common services for application software, like the event detector processes or objects, for example. Such OS services may also comprise instantiating functionalities, i.e. functionalities for creating a process and/or object instance, to which an apparatus for migrating may have access to. That is to say, the apparatus for migrating or migration apparatus may comprise means for accessing process and/or object instantiating functionalities of an operating system controlling the distributed system.

In some embodiments the distributed computing system may be coupled to a locating system for locating and/or tracking objects within a predefined geographical area, wherein the locating system provides the at least one sensor data stream to the distributed computing system, the sensor data stream carrying data being indicative of geographical positions of the located objects. The locating system may be based on a wireless sensor network, which has been already described in the introductory portion of this specification.

An event detector may comprise a state machine, which may be understood as a behavioral model used to design an event detector process' underlying computer program. A state machine is composed of a (finite) number of states associated to transitions, wherein transition is a set of actions that starts from one state and ends in another (or the same) state. A transition is started by a trigger, wherein such a trigger may, for example, be a primitive or composite event or raw sensor data input to the event detector. Hence, according to aspects of the present invention, an event detector may comprise a state machine and an event detector process' content or memory may reflect a current state of said state machine, as, for example, individual variables or arrays or variables. For event detector processes the state machine may be a software-based state machine, e.g. a Unified Modeling Language (UML) state machine.

One benefit of embodiments may be seen in the self-organization of a distributed computing system according to embodiments of the present invention. Such a distributed computing system may react on changing system conditions by transferring event detectors between network nodes, such that the distributed system or network is always capable of performing robust and efficient event signal processing.

Usually it is not possible to run both the old and the new event detector in parallel if CPU overload or buffer overflow have triggered the migration. Moreover, forwarding the complete data stream from the old node to the new node is prohibitive as it may cause high network loads and processing overheads for a long time if particular events occur sparsely. Embodiments propose a concept that allows migrating event detectors at runtime and initializes the K-values according to the timing delays at the new node. The introduced latency is negligible and both, the old and the new detector instances as well as upper level detectors see in-order events at any time. The old event detector can stop as soon as the state has been copied, and networking overhead is kept at a minimum.

BRIEF DESCRIPTION OF THE FIGURES

Some embodiments of apparatuses and/or methods will be described in the following by way of example only, and with reference to the accompanying figures, in which FIG. 1 schematically illustrates a flow-chart of a method for migrating an event detector running on a first node to a second node of a distributed computing system, according to an embodiment.

DESCRIPTION OF EMBODIMENTS

Various example embodiments will now be described more fully with reference to the accompanying drawings in which some example embodiments are illustrated. In the figures, the thicknesses of layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements through-out the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
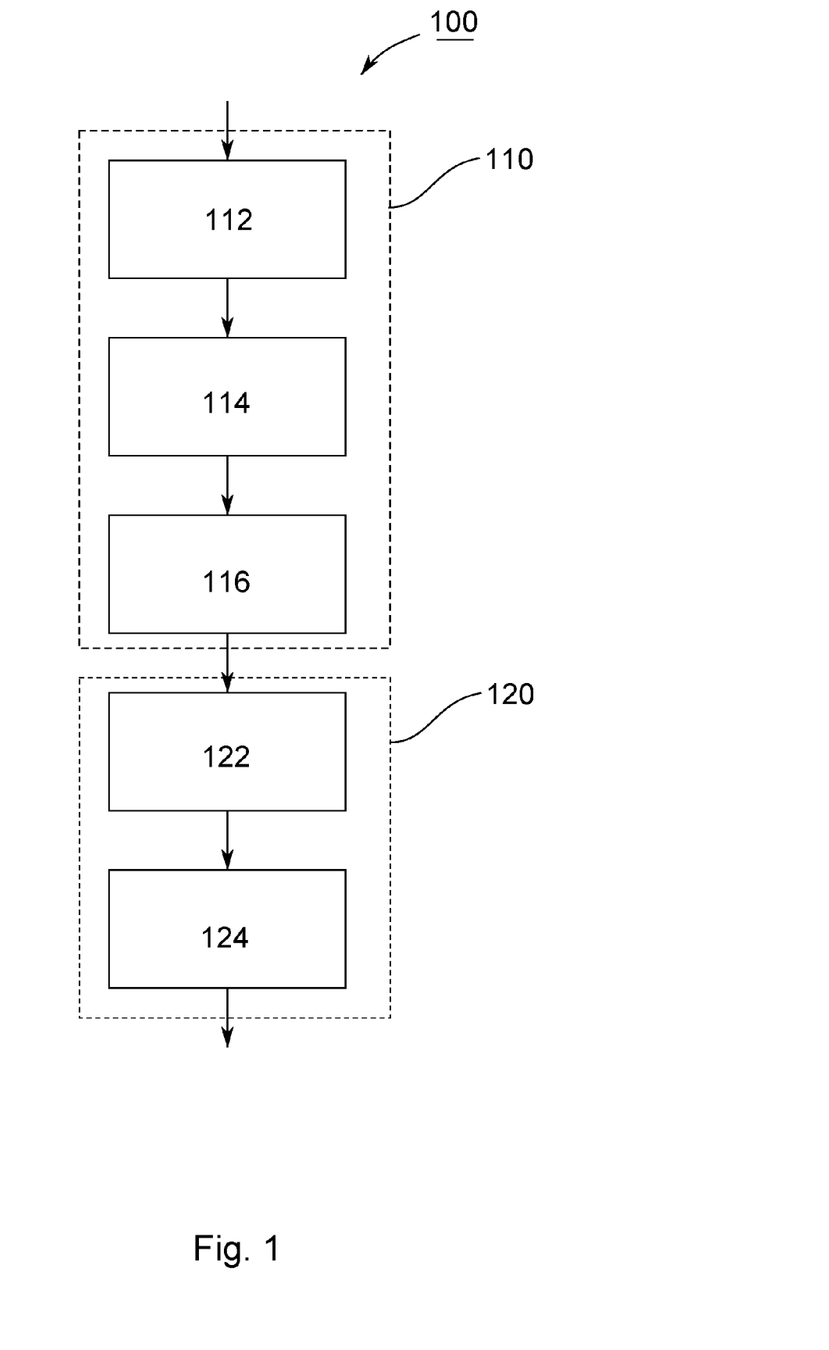

FIG. 1 schematically illustrates a flowchart of a method 100 for migrating or transferring an event detector initially running on a first (old) node or machine seamlessly to a second (new) node or machine of a distributed computing system, according to an embodiment of the present invention.

The migration method 100 comprises two sub-methods 110 and 120. The steps of submethod 110 may be associated to the first network node, wherein the steps of the second sub-method 120 may be associated to the second network node, according to some embodiments. However, this does not imply that the sub-methods 110 and 120 are only performed by the first and second network node, respectively. Instead, method 110 may partly be performed on the second network node, for example. As has been explained before, the first and the second nodes of the distributed computing system may, for example, be separate CPUs. Such separate CPUs may be either located in physically different computing devices or may correspond to different independent processing cores of a multi-core CPU, for example.

The event detector instance to be migrated from the first to the second node processes a plurality of subscribed input events in order to generate at least one composite output event based on the subscribed input events. That is to say, the input events are of a lower event hierarchy level than the generated composite output event. Each of the subscribed input events has associated therewith an individual event delay δ(.), which corresponds to a time difference between an event occurrence or a detection time (ts or dts) and a subsequent event reception or arrival time (ats) of the respective event at the first node.

The method 100 or 110 comprises a step 112 of transferring, from the first node to the second node, information indicative of the individual event delays (or a maximum thereof) corresponding to the plurality of subscribed input events at the first network node. The method 100 or 110 further comprises a step 114 of transferring a content and/or state of the event detector from the first node to the second node in order to attain a migrated event detector at the second node. As has been explained before, the event detector may comprise a finite state machine comprising a finite number of states and certain transitions in between said states. That is to say, the content of the event detector to be migrated may reflect a current state of the processor state machine, as, for example, individual variables or arrays of variables.

Further, the method 100 or 110 comprises a step 116 of forwarding the plurality of input events from the first node to the second node. As will be apparent to the skilled person the steps 112, 114 and 116 may be performed or executed by the first node itself. Hence, the steps 112 to 116 together form the method 110 which may be performed by the first network node or a central controller device, which may control the computational interaction and/or communication between various network nodes.

The migration method 100 or sub-method 120 further comprises a step 122 of receiving, at the second network node, the plurality of input events forwarded from the first node and, in parallel, from originating event detectors associated to the plurality of input events. That is to say, in step 122 each of the plurality of input events is received at the second node via two paths. A first path is a detour path leading from an originating our source event detector of a respective input event via the first network node to the second network node. The second path is a direct path leading from an input event's originating event detector "directly" to the second node. Here, "directly" means through the distributed computing network without making the detour via the first node. Step 122 is followed by a step 124 of ordered processing, at the second node, the plurality of received input events based on the transferred information on the individual event delays (or the maximum thereof) coming from the first node and based on new individual event delays of the plurality of input events directly received from the associated originating (source) event detectors. That is to say, step 124 also comprises deriving a correct order of the input events by combining delay information from the events that arrive along the detour or rerouted path with delay information from events that arrive at the second node along the direct path.

As it will be apparent to the skilled person, the steps 122 and 124 together make up the method 120 which may be performed at the second network node of the distributed computing system. In order to be able to perform the respective steps of the methods 100, 110, and 120, the distributed computing system and/or the first network node and/or the second network node may comprise respective means for executing the individual steps, respectively. Thereby, such means, as, for example, a means for transferring, a means for forwarding, a means for receiving or a means for processing, may comprise electrical analog or digital circuitry, which may be programmed accordingly. For example, a distributed computing system may comprise a plurality of CPUs functioning as individual network nodes. Correspondingly, the first and/or the second network node may be individual, separated CPUs of the distributed computing system. According to some embodiments the distributed computing system may be coupled to a (wireless) sensor network, in particular a positioning or locating network, which has been described in the introductory portion. In case of a locating sensor network the latter may deliver raw sensor data or raw events, comprising position data as well as kinematic data, to the distributed computing system. The raw sensor data may be regarded as the lowest level of event data in the distributed computing system. It may also serve for delivering the clock signal clk. Based on the lowest level raw sensor data, so-called primitive events may be detected as first-level events. That is to say, primitive events are only based on raw (location) sensor data. All higher-level events are then derived from the primitive events, which has the advantage that the extremely high data rates of the raw sensor data may be avoided within the distributed computing system. This may enable real-time event detection and processing, such as required by event detection for highly-popular sports events, such as soccer, for example. That is to say, in a particular embodiment the distributed computing system may be used for detecting events in a sports game, such as soccer, rugby or American football.

Embodiments of the present invention will now be further detailed referring to the FIGS. 2 to 5.

Figure 2A:
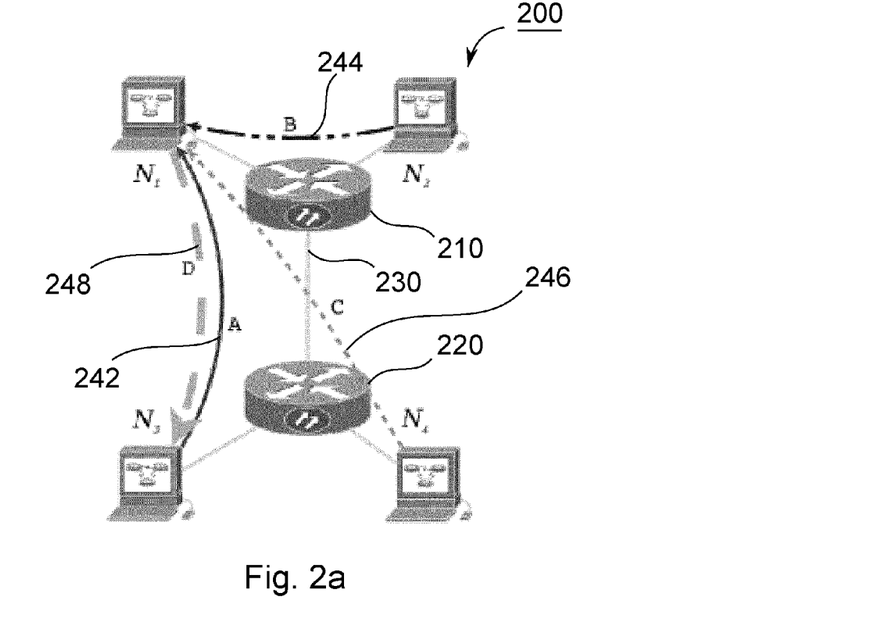
FIG. 2a,b show exemplary setups before and after event detector migration.

Consider a network topology of a distributed computing system 200 depicted in FIG. 2a. The exemplary distributed computing system 200 comprises routers 210 and 220. Each router 210, 200 has associated thereto a plurality of network nodes of the distributed computing system 200. For example, router 210 has associated thereto a first network node $N_1$ and a second network node $N_2$. The second router 220 has associated therewith a third network node $N_3$ as well as a fourth network node $N_4$ of the distributed computing system 200. Routers 210 and 220 are interconnected via link 230 (e.g. an Ethernet link) such that all network nodes $N_1$ to $N_4$ are interconnected with each other.

FIG. 2a exemplarily illustrates a network situation before an event detector migration from node $N_1$ to node $N_2$. Before its migration, an example event detector runs on node $N_1$ and subscribes three input events A (published or emitted by node $N_3$), B (published by node $N_2$), and C (published by node $N_4$). The event detector to be migrated from node $N_1$ to $N_2$ generates, based on the subscribed input events A, B, and C, composite event D, which again is subscribed by network node $N_3$. In other words, input event A is provided to the event detector running on the first network $N_1$ by originating or source event detector running on node $N_3$ (see reference numeral 242). The second input event B is provided to the event detector of node $N_1$ by the second network node $N_2$ (see reference numeral 244). The third input event C is provided to the event detector running on network node $N_1$ by network node $N_4$ (see reference numeral 246). The event detector running on the first network node $N_1$ is an originating or source event detector for the composite event D which is initially provided from network node $N_1$ to a higher level event detector running on network node $N_3$ (see reference numeral 248).

Figure 2B:
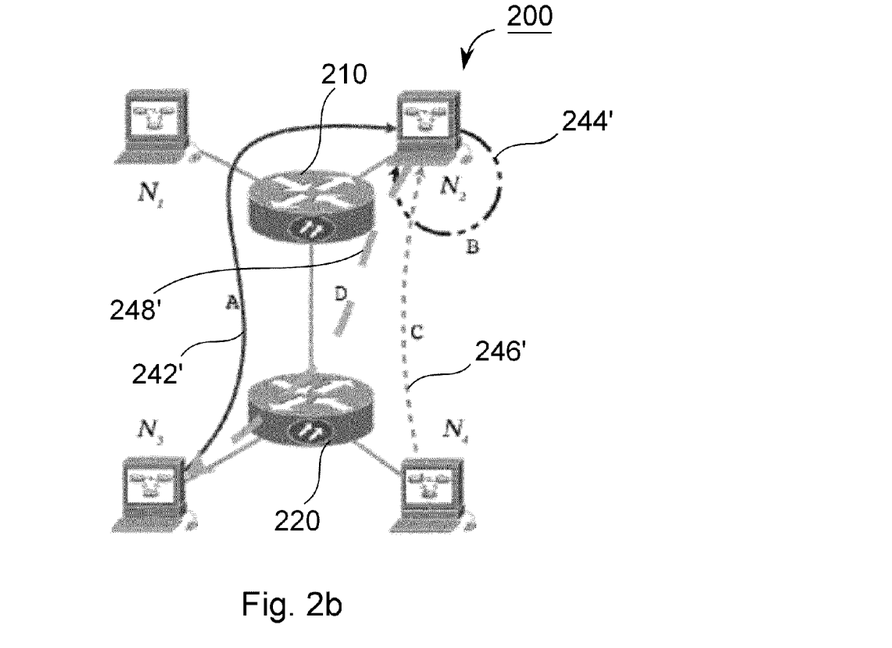

Turning now to FIG. 2b it is illustrated a scenario after the event detector for composite event D has been migrated or transferred from the first network node $N_1$ to the second network node $N_2$ by making use of method 100. When this event detector is migrated from $N_1$ to $N_2$ the source nodes of the subscribed input events A, B and C remain the same (i.e. $N_3$, $N_2$, $N_4$), but their associated event delays most definitely change. Exemplarily, a delay $\delta(B)$ of input event B at the new node $N_2$ may shrink due to migration, because input event B is now a local event on the second network node $N_2$ after migration. The delays of the other subscribed input events A and C may or may not shrink. Note that the delay of the composite event D at network node $N_3$ may also change even though the subscriber at node $N_3$ does not participate in the migration.

Unless event delays δ(.) shrink for all involved events, a naive migration is likely to fail because the migrated event detector on node $N_2$ or any event detectors on a higher layer no longer sees the subscribed events A, B and C in a correct (temporal) order because the K-value that worked well on the old node ($N_1$) may be too small for the new node ($N_2$) and the new event delays δ'(.) after migration.

Embodiments of the present invention aim to guarantee ordered input events for the migrated event detector by measuring and adapting event delays. Usually, it may not be possible to run both the old and the new event detector in parallel if CPU overload or buffer overflow have triggered the migration. Moreover, forwarding the complete data stream from the old node to the new node is prohibitive as it may cause high network loads and processing overheads for a long time, if particular events occur sparsely.

Embodiments of the present invention may migrate or transfer event detectors at runtime and initialize the K-values according to the old event delays at the new node. The introduced latency is negligible and both, the old and the new event detector instances as well as upper level event detectors may see in-order events at any time. The old event detector can stop as soon as its content or state information has been copied/transferred to the new network node, and networking overheads may be kept at a minimum.

An idea behind embodiments of the present invention is that for a cooperative migration or handover of the event detector from one node to another the new network node not only subscribes necessary input events from their originating or source event detectors, but the old node also forwards those input events to the new node as well. In this way, the new computing node may derive the correct temporal order (or K-value) by combining event delay information from the input events that arrive along two different paths (detour path via old node and direct path from input event sources).

Figure 3:
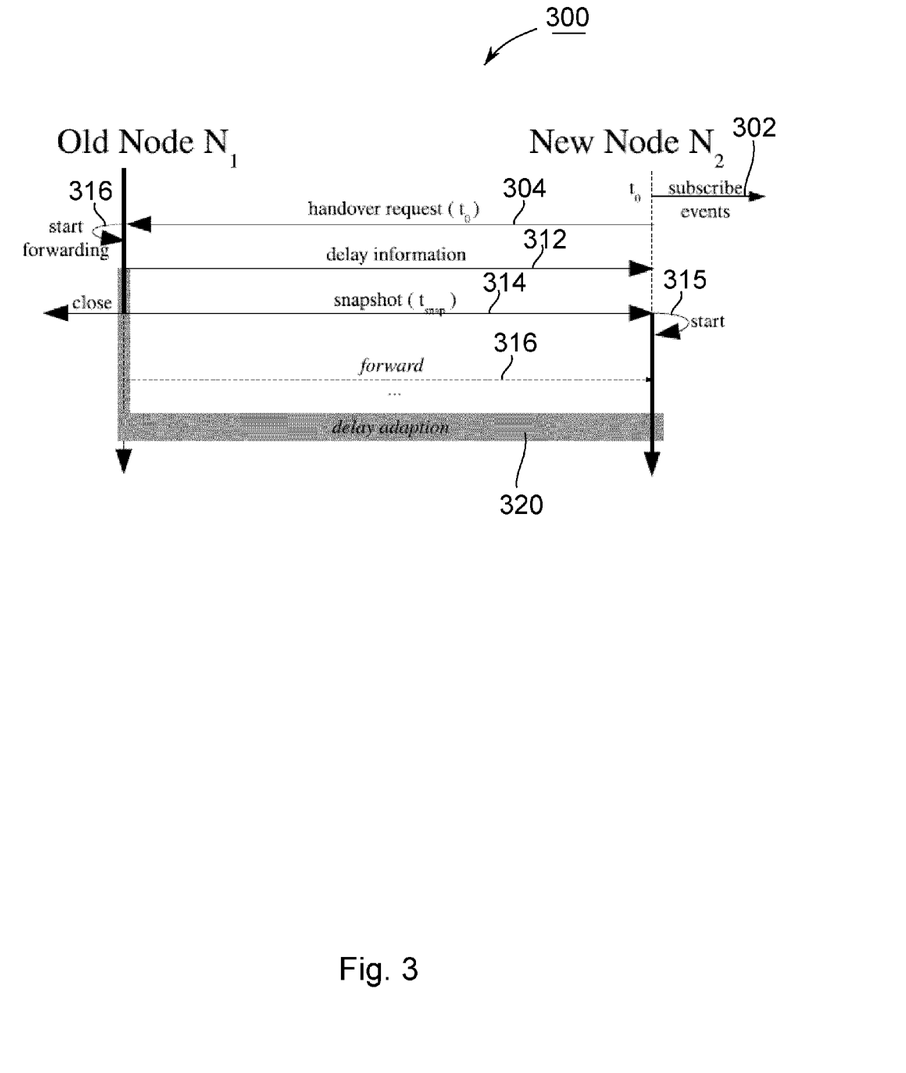
FIG. 3 shows a message sequence chart for an event detector migration, according to an embodiment.

FIG. 3 depicts a Message Sequence Chart (MSC) 300 of an exemplary event detector migration process according to an embodiment.

As can be seen from the message sequence chart 300 network node $N_2$ may at first subscribe (see reference numeral 302) to the input events A, B and C of the event detector process or object still to be executed on the (old) first node ($N_1$). Here, the subscription 302 to the input events A, B and C takes place at a time instant $t_0$. The subscription 302 may, for example, take place in response to a migration instruction, which has been received from a central network controller at network node $N_2$. Said central controller entity may have information on more or all delays of event signals traveling along different routes in the distributed system. Thereby, an event's delay may, for example, be due to different jitter, different processing capabilities and/or different signal propagation times of the different network paths or routes. Alternatively or additionally, the central controller may have information on more or all load situations (e.g. CPU-load) of individual nodes and/or information indicative of an overall system load. Hence, according to some embodiments, an apparatus for migrating may have overall system parameter knowledge. According to yet other embodiments, the apparatus for migrating may also be non-central, i.e., distributed over a plurality of network nodes. In this case, a network node may only have limited information indicative of its own load or event delay situation. Hence, overall system parameter knowledge may not be available in some embodiments.

The MSC 300 also assumes that an event detector instance has already been created (instantiated) on the new network node $N_2$. That is to say, an apparatus for migrating may also comprise means for creating a process or object instance, which is corresponding to the first event detector, on the second node in order to obtain the second event detector. An instance is to be understood as an occurrence or a copy of an object, whether currently executing or not. Instances of a class or an object share the same set of attributes, yet will typically differ in what those attributes contain.

Also, at the time instant $t_0$ or shortly after said time $t_0$, the second network node $N_2$ may send a handover request message to the first network node $N_1$ (see reference numeral 304). In response to the latter handover request message the old network node $N_1$ may start forwarding the plurality of input events A, B and C from the first node $N_1$ to the second node $N_2$ (see reference numeral 316). Further, the first node $N_1$ may respond to the handover request message of step 304 with two messages. A first message transferred from the old node $N_1$ to new node $N_2$ may hold the current delay information for each subscribed input event A, B and C (see step 312). That is to say, information on the individual event delays corresponding to the plurality of input events A, B and C are transferred from the first node $N_1$ to the second node $N_2$ in step 312. For example, the node $N_1$ may receive the input events with event delays delays δ(A)=30 ms, δ(B)=10 ms and δ(C)=20 ms, such that K=max (δ(A), δ(B), δ(C))=30 ms. Thereby, the delays δ(.) may already include the respective safety margins. Hence, according to some embodiments the individual delay values δ(A), δ(B), δ(C) and/or the resulting K-value K=max (δ(A), δ(B), δ(C)) may be transferred from node $N_1$ to node $N_2$ via message 312. The delay information packet or message 312 may also hold the current timestamp ts so that the second node $N_2$ may determine $d_f$=clk−ts, that is, the sub-delay $d_f$ of forwarding an event from node $N_1$ to node $N_2$. Let $d_f$ be 5 ms for the present example. In other words, transferring the event delay information of the input events A, B and C from the first node $N_1$ to the second node $N_2$ may comprise transferring a transfer timestamp ts being indicative of a time instant at which said information has been sent from the first node $N_1$ to the second node $N_2$. Also, transferring the event delay information may comprise determining, at the second node $N_2$, a common transfer delay $d_f$ from the first node $N_1$ to the second node $N_2$, wherein the common transfer delay $d_f$ is indicative of a time difference between the transfer timestamp and a reception or arrival time of the information on the event delays at the second node $N_2$. Having the delay information of message 312 at hand, the second node $N_2$, may process the plurality of received input events A, B and C initially based on the transferred event delay information (δ(A), δ(B), δ(C) and/or K) and the common transfer delay.

The aforementioned second message or packet, which may be transferred from the old node $N_1$ to the new node $N_2$ in step 314 comprises a snapshot (i.e. a copy of the present state) of the event detector. In other words, in step 314 a content of the event detector may be transferred from the first node $N_1$ to event detector instance of the second node $N_2$ to obtain a migrated event detector at the second node $N_2$.

For example, operating system services may comprise copying or transferring functionalities, to which a transferring means for transferring the content may have access to. That is to say, a transferring means may comprise means for accessing process or object copying functionalities of an operating system running on the computing nodes or some other controlling entity of the distributed system. The transferring means may also be operable to "freeze" the content of the first event detector at a predefined time instant in order to obtain a defined condition of the first event detector at the freezing time instant. In other words, transferring the content of the event detector from the first node $N_1$ to the second node $N_2$ may comprise freezing a current state of the event detector of the first node $N_1$ and copying the frozen state to an instance of the event detector of the second node $N_2$. Thereby, "freeze" means that the event detector is brought into a determined state and ceases to respond to its inputs at the freezing time instant. In other words, the first event detector may be halted at the freezing time instant in order to copy its content or state condition to the instantiated second event detector.

Hence, transferring the content 314 may comprise copying the frozen content/state from the first event detector to the second event detector in order to obtain the same determined state or defined condition at the second event detector of node $N_2$.

Before the newly instantiated, i.e. second, event detector is started or switched on at the second node $N_2$, the (identical) input events of both event detectors may be buffered such that both event detectors, which, due to the copying, ideally already have the same defined internal condition, also obtain identical input data starting from the predefined time instant, i.e. the "freeze" instant. Since clocks may vary between both nodes, node $N_1$ should ensure that the second node $N_2$ can buffer all events such that it can recover the correct state originating from the transferred snapshot. For example, if node $N_1$ has not processed an input event since time instant $t_0$, its current state may be used for the snapshot and $t_{snap}=t_0$. Otherwise $t_{snap}$ may be set to the occurrence timestamp of the last processed input event of node $N_1$. After sending the snapshot in step 314 the first network node $N_1$ may terminate the event detector as the new node $N_2$ may now take over and start running the copy of the original event detector, which is indicated by reference numeral 315. After closing down the even detector at old node $N_1$ and starting the instance of the event detector at new node $N_2$ the old node $N_1$ may continue to forward the input events A, B and C (see reference numeral 316) to the new node $N_2$ until the latter one has finished an event delay adaptation procedure 320 which will be described in the sequel.

For instance, at time instant $t_0$=clk=100, the second (i.e. new) network node $N_2$ sends the handover request message 304 to old network node $N_1$. As old network node $N_1$ is continuously processing subscribed input events A, B and C, it may already be busy with an input event having timestamp 180. When the handover request message from node $N_2$ arrives, the old network node $N_1$ may take the snapshot of the original event detector, set $t_{snap}$ to 180 (corresponding to the timestamp of the latest processed input event), send the snapshot message 314 to new network node $N_2$ and terminate the original event detector at network node $N_1$. New network node $N_2$ may set the state of the new event detector instance and process any buffered input events A, B and C with a timestamp above t snap (i.e. 180) only. That is to say, forwarding the input events A, B and C from the old network node $N_1$ to the new network node $N_2$ comprises buffering, at the new node $N_2$, all forwarded and/or received input events A, B and C, beginning at the time $t_0$ of the handover request message 304 until the snapshot time $t_{snap}$. When the migrated event detector at new node $N_2$ starts running, it may process buffered event having a timestamp, i.e. occurrence time, above the snapshot time $t_{snap}$. In other words, receiving the plurality of input events A, B, C forwarded from the first node $N_1$ may comprise, at the new node $N_2$, buffering all forwarded input events A, B, C until the snapshot time $t_{snap}$ when the frozen content/state of the event detector is transferred from the first node $N_1$ to the second node $N_2$, and wherein processing the plurality of received input events A, B, C at the second node $N_2$ comprises processing buffered events having an event time stamp or occurrence time above the snapshot time $t_{snap}$.

In the following, the adaptation of the event delay information ($\delta(A)$, $\delta(B)$, $\delta(C)$ and K) of step 320 will be described in more detail. During step 320 the transferred event delays $\delta(A)$, $\delta(B)$, $\delta(C)$ from old node $N_1$ and/or the resulting K-value may be successively adapted or updated. Further, echoes of subscribed input events which are received at the second node $N_2$ via the detour path from old node $N_1$ are cancelled. With embodiments it is possible to correctly move a running event detector from a first network node $N_1$ to a second network node $N_2$. Nevertheless, at the new network node $N_2$ the event delays of the subscribed input events A, B and C and therefore suitable K-values may be different, as the delays of the subscribed events may have changed due to the migration and the resulting direct reception. Instead of computing the buffer size $K'_D$ for the composite event D from scratch at the second node $N_2$, said buffer size $K'_D$ may be initialized according to the event delay information received from old node $N_1$ by means of the delay information message 312. That is to say, the maximum delay or buffer size $K'_D$ at new node may be determined according to $$K'_D = K_D + d_f$$
$$= \max(\delta(A) + d_f, \delta(B) + d_f, \delta(C) + d_f)$$
$$= \max(30 + 5, 10 + 5, 20 + 5) = 35 \text{ ms},$$

wherein $K_D$ denotes the buffer size of composite event D at the old node $N_1$.

That is to say, step 124 of processing the plurality of received input events A, B and C at the second node $N_2$ may comprise determining an output time $t_{out}$ for relaying a received input event to the migrated event detector based on its respective event occurrence or detection time and a maximum event delay $K'_D$ of the plurality of input events A, B and C.

Figure 4:
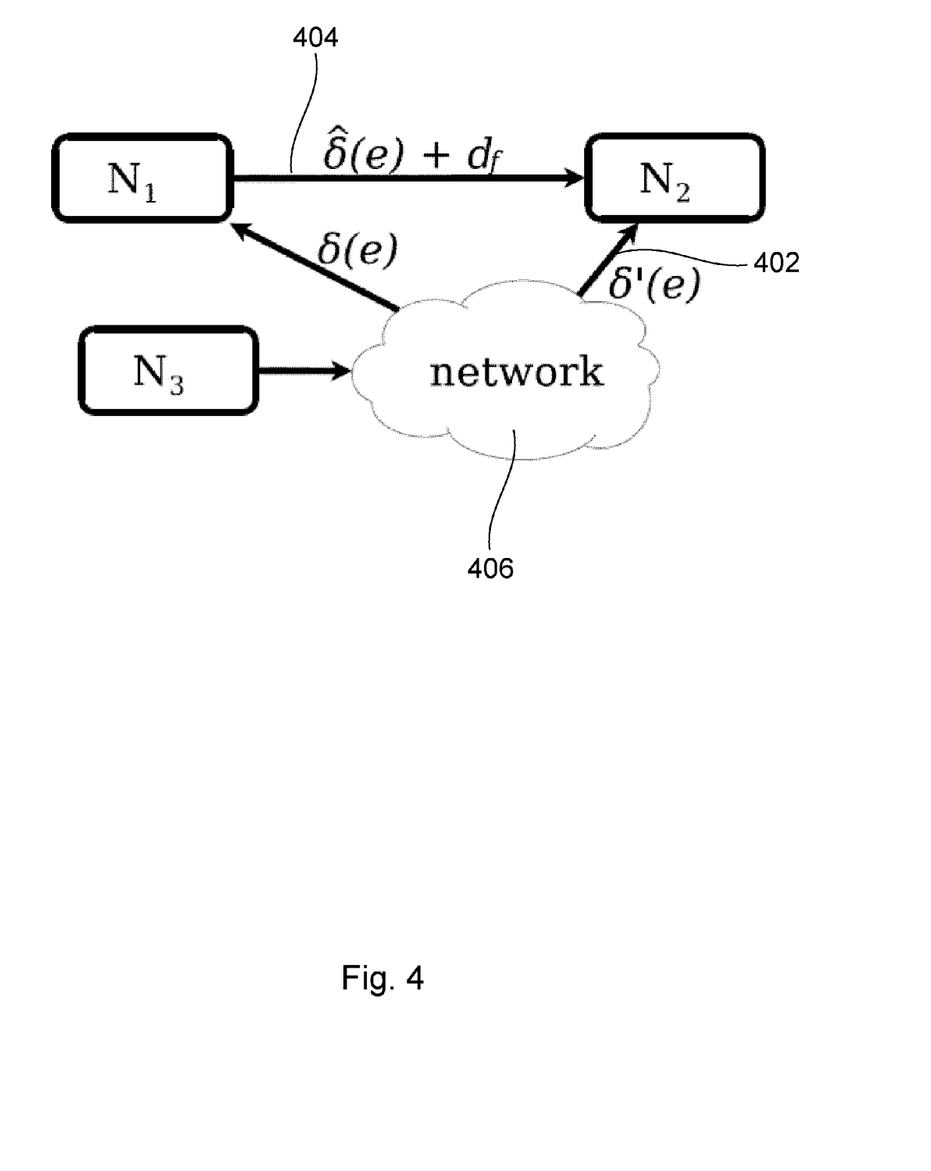
FIG. 4 shows event delays before, during, and after event detector migration.

As shown in FIG. 4, the new network node $N_2$ receives all input events (A, B and C) twice. In general, an input event e reaches the new node $N_2$ on a direct path 402 with a delay $\delta'(e)$ and it also reaches the new node $N_2$ on a detour path 404 via the old network node $N_1$. Thereby, the direct path 402 reaches from an originating or source node $N_3$ through the distributed network 406 directly to destination node $N_2$, whereas the detour path reaches from source node $N_3$ through the network 406 to old node $N_1$ and from there to new node $N_2$. As soon as new node $N_2$ receives an input event e along the direct route 402, it may update its buffer size K by using $\delta(e)$ instead of $\delta(e)+d_f$. That is, the step of processing 124 also comprises updating the information on the individual event delays based on individual event delays of the plurality of input events received from the associated event detectors via the direct path 402. That is, the information on an individual event delay corresponding to an input event at the first node may be updated as soon as said input event is received at the second node via a direct path 402 from the source event detector $N_3$ associated to the input event e, such that the corresponding old event delay $\delta(e)+d_f$ is replaced by a difference between the event's occurrence or a detection time at the originating event detector $N_3$ and an event reception or arrival time of the respective event e at the second node $N_2$.

For instance, a new (direct) delay of δ'(A)=25 ms for the first directly received event A would reduce the required buffer size $K_D$ to from 35 ms to max (25,15,25)=25 ms. An updated K-value may be announced from the second node $N_2$ to subscribing event detectors on higher or upper event hierarchy levels. That is to say, in case updating the transferred event delay information leads to an updated maximum event delay or buffer value (K-value) of the plurality of input events (e.g. A, B, C), said updated maximum event delay or buffer value may be communicated to downstream or higher layer event detectors, which are using an output event D of the migrated event detector of the second node $N_2$ as an input event. In other words, this means that the updated K-value may be communicated to higher layer event detectors that have subscribed to the composite event D of the migrated event detector.

While receiving the input events at the new node twice may be advantageous for initializing the new buffer size K, echoed input events would pose problems for a migrated event detector. To make sure that an event ordering unit associated to the migrated event detector only sees an input event once, one of the echoed events needs to be dropped. For each event type A, B, C there will be a first time when the new node $N_2$ sees both an event via the direct path 402 and its echo via the detour path 404. Before that moment, the input event with the lower delay is passed along the ordering unit, while the later received version of the input event is dropped. As soon as the direct event version, that is the event e's version received via the direct path 402, is received the old node $N_1$ may be notified that this particular event type is not to be forwarded any longer from the old node $N_1$ to the new node $N_2$. That is to say, the second node $N_2$ may be operable to inform the first node $N_1$ to stop forwarding an input event e as soon as the second node $N_2$ has received the respective input event e via the direct path 402 from an originating event detector (e.g. $N_3$) of the distributed computing system 406. A sender of an event may, for example, be determined via sender information comprised by received packets.

Figure 5:
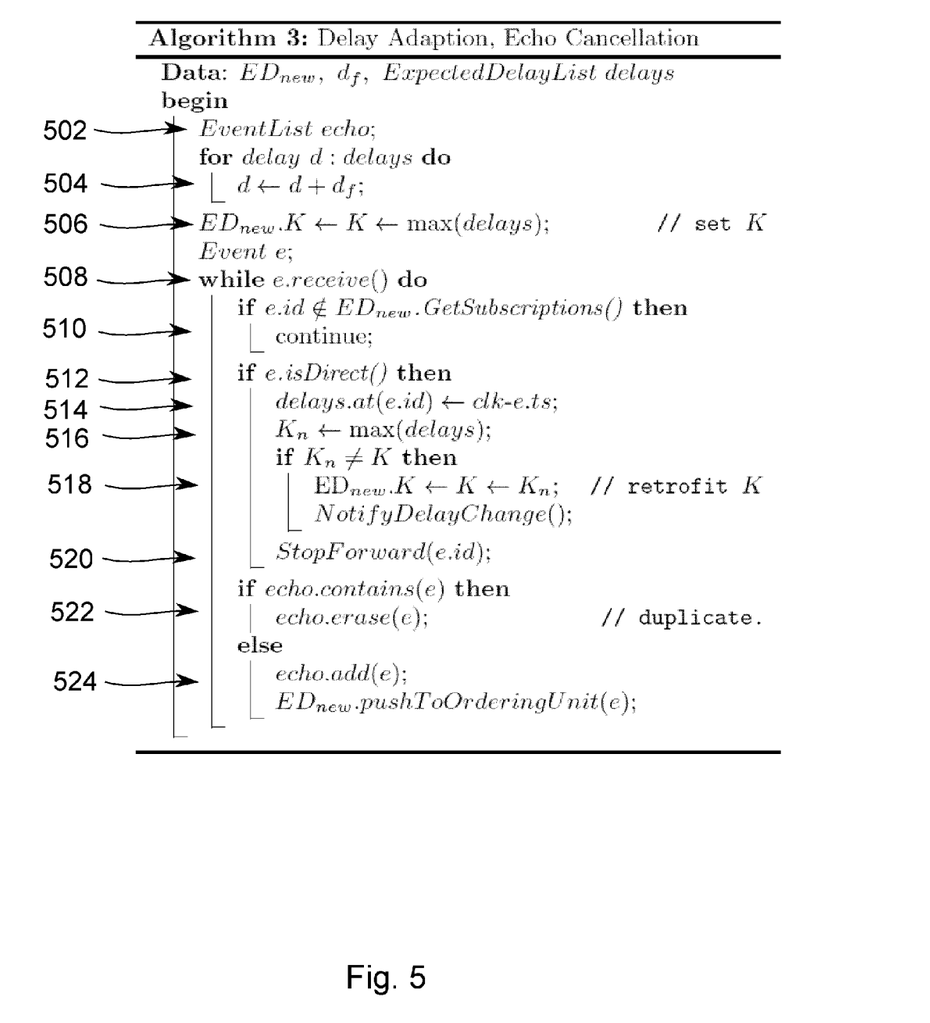
FIG. 5 illustrates an exemplary pseudo-code for a computer-program for delay adaption and echo cancellation, according to an embodiment.

Turning now to FIG. 5, there is illustrated an (abbreviated) pseudo code 500 of the described delay adaptation and echo cancellation, according to an embodiment of the present invention.

The illustrated pseudo code 500 begins with an initialization of an object echo of type EventList (see reference numeral 502). Then, in a for-loop 504 the event delays d of the migrated event detector are initialized with the event delays transferred from the first node plus the common transfer delay value $d_f$. In a step 506 the K-value of the new or migrated event detector $ED_{new}$ is determined according to max(delays). The first if-statement 510 within the while-loop 508 checks whether an ID of a received event belongs to the amount of subscribed events. If this is not the case, then the reception of events is continued until a subscribed input event e is received. If the subscribed input event e has been received by the direct path 402 (see if-loop 512), then the event delay of event e having the id is updated to the value clk−e.ts (see reference numeral 514). Subsequently, the K-value is updated in line 516. In case the updated K-value $K_n$ is not equal to the formerly determined K-value K, the K-value of the new or migrated event detector $ED_{new}$ is updated to the new K-value $K_n$. Additionally, the changed K-value is notified to higher layer event detectors (see if-statement 518). Also, the old node $N_1$ is notified that it is not necessary to continue forwarding the event e having the identifier id (see line 520). In the next if-statement 522 an echo of event e is deleted or erased in case it is present. Otherwise, the echo is added (see reference numeral 524) and the received event e is pushed to the ordering unit associated to the new or migrated event detector instance $ED_{new}$.

The cooperative handover or migration concept according to embodiments of the present invention may perform safe migration of event detectors from a first node to a second node of a distributed computing system and may simultaneously ensure a total event order for the new event detector. Event detectors may be copied and immediately shut down because the migrated event detector interactively calibrates its K-values. Embodiments of the present invention may achieve reliable, distributed event processing of high data rate sensor streams even under the predominance of out-of-order events. Event delays may be measured and adapted at runtime and events may be postponed as long as necessary to guarantee a total order on incoming event streams. No a priori knowledge of event delays is required. To balance load and to better use an available computing power, event detectors can migrate at runtime while timing constraints are still kept valid.

Embodiments of the present invention work well on a real time locating system (RTLS) in a soccer application. Such an RTLS may, for example, track 144 transmitters at the same time at 2000 sampling points per second for a ball and 200 sampling points per second for players and referees. Each player may be equipped with four transmitters, one at each of his limbs. The raw sensor data from the transmitters comprises absolute positions in millimeters, velocity, acceleration and Quality of Location (QoL) for any direction. Soccer needs these sampling rates. With 2000 sampling points per second for the ball and a velocity of up to 150 km/h, two succeeding positions may be 2 cm apart. Since soccer events like pass, double pass, shot on goal, etc., happen within a fraction of a second, event processing and migration should ensure that events are detected in time so that a hierarchy of event detectors may help a human observer, for example, a reporter, to work with the live output of the system.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted, configured or operable for performing a certain function, respectively. Hence, a "means for s.th." may as well be understood as a "means being adapted configured or operable to do s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

The invention claimed is:

1. A method for migrating an event detector of a first node of a distributed computing system to a second node of the distributed computing system, wherein the event detector processes a plurality of input events to generate at least one output event based on the input events, wherein each of the input events has associated therewith an individual event delay corresponding to a propagation time of the input event to the first node, the method comprising:
transferring, from the first node to the second node, information on event delays corresponding to the plurality of input events at the first node;
transferring a content of the event detector from the first node to the second node to obtain a migrated event detector at the second node;
forwarding the plurality of input events from the first node to the second node;
receiving, at the second node, the plurality of input events forwarded from the first node and, in parallel, from originating event detectors associated to the plurality of input events; and
processing, at the second node, the plurality of received input events based on the transferred information on the event delays and based on event delays of the plurality of input events received from the associated originating event detectors,
wherein the second node informs the first node to stop forwarding an input event as soon as the second node has received the respective input event via a direct path from an originating event detector of the distributed computing system.

2. The method of claim 1, wherein transferring the information on the event delays of the input events from the first node to the second node comprises transferring a transfer-timestamp being indicative of a time at which said information has been sent from the first node to the second node.

3. The method of claim 2, wherein transferring the information on the event delays comprises determining, at the second node, a common transfer-delay from the first node to the second node, wherein the common transfer-delay is indicative of a time difference between the transfer-timestamp and a reception time of the information on the event delays at the second node.

4. The method of claim 3, wherein processing the plurality of received input events at the migrated event detector is initially based on the information on the event delays at the first node and the common transfer-delay.

5. The method of claim 1, wherein transferring the content of the event detector from the first node to the second node comprises freezing a current state of the event detector of the first node and copying the frozen state to an instance of the event detector of the second node.

6. The method of claim 1, wherein receiving the plurality of input events forwarded from the first node comprises, at the new node, buffering all forwarded input events until a snapshot time when the content of the event detector is transferred from the first node to the second node, and wherein processing the plurality of received input events at the second node comprises processing buffered events having an event occurrence time above the snapshot time.

7. The method of claim 1, wherein the information on an event delay corresponding to an input event at the first node is updated as soon as said input event is received at the second node via a direct path from the originating event detector associated to the input event, such that the corresponding event delay related to the first node is replaced by an event delay related to the input event's direct path to the second node.

8. The method of claim 7, wherein processing the plurality of received input events at the second node comprises updating the transferred information on an individual event delay, and, in case said updating leads to an updated maximum event delay value of the plurality of input events, said updated maximum event delay value is communicated to event detectors having an output of the migrated event detector of the second node as an input.

9. The method of claim 1, wherein processing the plurality of received input events at the second node comprises determining a time for relaying a received input event to the migrated event detector based on its event occurrence time and a maximum event delay of the plurality of input events.

10. The method of claim 1, wherein an event is a primitive event, which is directly based on sensor data, or a composite event, which is based on primitive events.

11. The method of claim 1, wherein the input events are originally detected on distributed nodes of the distributed computing system, and wherein the input events are based on parallel sensor data streams of a geographical localization system.

12. A method for migrating an event detector of a first node of a distributed computing system to a second node of the distributed computing system, wherein the event detector processes a plurality of input events to generate at least one output event based on the input events, wherein each of the input events has associated therewith an individual event delay corresponding to a propagation time of the input event to the first node, the method comprising:

transferring, from the first node to the second node, information on event delays corresponding to the plurality of input events at the first node;

transferring a content of the event detector from the first node to the second node to obtain a migrated event detector at the second node;

forwarding the plurality of input events from the first node to the second node; and     receiving information at the first node which informs the first node to stop forwarding an input event as soon as the second node has received the respective input event via a direct path from an originating event detector of the distributed computing system.

13. A method for migrating an event detector of a first node of a distributed computing system to a second node of the distributed computing system, wherein the event detector processes a plurality of input events to generate at least one output event based on the input events, wherein each of the input events has associated therewith an individual event delay corresponding to a propagation time of the input event to the first node, the method comprising:

receiving, at the second node, the plurality of input events forwarded from the first node and, in parallel, from originating event detectors associated to the plurality of input events;

processing, at the second node, the plurality of received input events based on the transferred information on the event delays and based on event delays of the plurality of input events received from the associated originating event detectors; and     informing the first node to stop forwarding an input event as soon as the second node has received the respective input event via a direct path from an originating event detector of the distributed computing system.

14. A method for migrating an event detector of a first node of a distributed computing system to a second node of the distributed computing system, wherein the event detector processes a plurality of input events to generate at least one output event based on the input events, wherein each of the input events has associated therewith an individual event delay corresponding to a propagation time of the input event to the first node, the method comprising:

transferring, from the first node to the second node, information on event delays corresponding to the plurality of input events at the first node;

transferring a content of the event detector from the first node to the second node to obtain a migrated event detector at the second node;

forwarding the plurality of input events from the first node to the second node;

receiving, at the second node, the plurality of input events forwarded from the first node and, in parallel, from originating event detectors associated to the plurality of input events; and     processing, at the second node, the plurality of received input events based on the transferred information on the event delays and based on event delays of the plurality of input events received from the associated originating event detectors,     wherein the information on an event delay corresponding to an input event at the first node is updated as soon as said input event is received at the second node via a direct path from the originating event detector associated to the input event, such that the corresponding event delay related to the first node is replaced by an event delay related to the input event's direct path to the second node,     wherein processing the plurality of received input events at the second node comprises updating the transferred information on an individual event delay, and, in case said updating leads to an updated maximum event delay value of the plurality of input events, said updated maximum event delay value is communicated to event detectors having an output of the migrated event detector of the second node as an input.

\* \* \* \* \*